United States Patent [19]
Heine

[11] 3,832,042
[45] Aug. 27, 1974

[54] INTERNAL READING DEVICE FOR OPHTHALMOLOGICAL INSTRUMENTS

[75] Inventor: Helmut A. Heine, Herrsching/Upper Barrenia, Germany

[73] Assignees: Propper Manufacturing Co., Inc., Long Island City, N.Y.; Optotechnik Heine KG, Herrseching, Germany; part interest to each

[22] Filed: Nov. 20, 1972

[21] Appl. No.: 308,254

[52] U.S. Cl.............. 351/6, 350/96 B, 350/110, 350/112, 350/113, 351/10, 351/11, 351/12, 356/142
[51] Int. Cl...... A61b 3/12, G02b 27/34, G02b 5/14
[58] Field of Search............... 351/6, 10, 11, 12, 13, 351/14, 15, 16; 350/96 B, 110, 111, 112, 113, 114, 115; 356/142

[56] References Cited
UNITED STATES PATENTS
2,475,975  7/1949  McCarthy et al............. 356/142 X
3,441,340  4/1969  Moore et al..................... 351/12 X
3,668,993  6/1972  Kurie............................. 350/114 X
3,698,099  10/1972  Matsura................................. 351/6

Primary Examiner—Paul A. Sacher
Attorney, Agent, or Firm—Amster & Rothstein

[57] ABSTRACT

An ophthalmological instrument in which selected parameters of the optical function of the instrument may be varied during use is provided with an internal optical system under control of the user whereby figures, symbols, scales or other indicia identifying the momentary value of the variable parameters are rendered visible to the user in the instrument viewing aperture while the instrument is in use.

5 Claims, 8 Drawing Figures

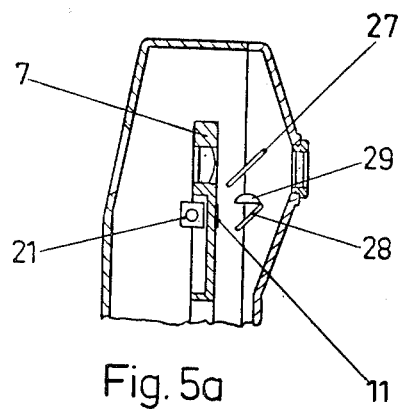
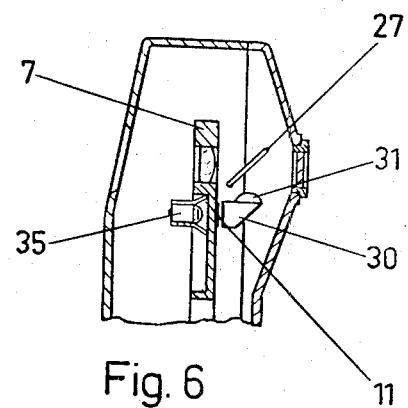
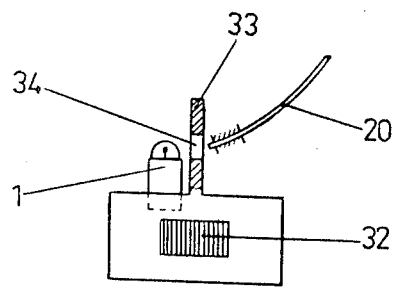
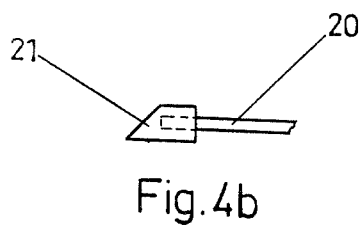
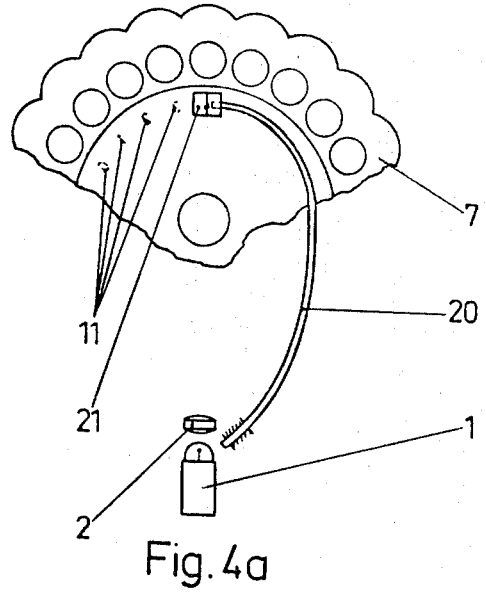

INTERNAL READING DEVICE FOR OPHTHALMOLOGICAL INSTRUMENTS

The invention relates to a device for the internal reading of figures, symbols, scales, and the like, in ophthalmological hand instruments such as ophthalmoscopes, skiascopes, etc.

For example, in the case of ophthalmoscopes, the reading of the power of refraction of a lens brought into the viewing path is necessary in order to provide the examining physician with the possibility of making diagnostic decisions, on the basis of these refraction values, concerning the characteristics of the patient's eye. For example, in order to focus sharply on a prominence, i.e., a point that rises above the normal level at the back of the eye, the physician must put a lens of a different power of refraction into series with the first, in order to achieve a sharper focus at the normal level of the retina. The difference in the power of refraction of the two focuses can be used to calculate the height of the prominence. It is also necessary to know the power of refraction, to give another example, when the refraction of the patient's eye is to be determined.

It is a well known fact that, in order to make possible this reading of the power of refraction, the lenses to be placed in series must be arranged in a wheel of lenses, and the numbers giving the refractive power of the lens must be written onto the lens wheel in some suitable fashion, with only those numbers corresponding to the lenses placed in the viewing path appearing in a viewer. Such an arrangement, which is the subject of U.S. Pat. No. 1,059,715 of Apr. 22, 1913, is shown in FIGS. 1 and 3.

In the case of hand ophthalmoscopes that have an illuminating device with a built-in incandescent bulb to light up the back of the eye, it is also known how to illuminate numbers located on the lens wheel with light from this same bulb, so as to permit reading these numbers in the dark. Also known to the state of the art is the location of a magnifying glass in the viewing window, for the purposes of enlarging the numbers. Such an arrangement may be seen, for example, in U.S. Pat. No. 2,707,101 of May 10, 1955.

In order to use ophthalmoscopes with the known type of device for reading power of refraction, it is necessary to interrupt the examination in order to make the reading. For example, if the examiner has found the lens that can provide him with a sharp focus at the normal level of the back of the eye, then he must remove the ophthalmoscope from his eye in order to read the numbers that will provide him with the refractive power of the inserted lenses. If he now wishes to determine which lenses he must insert in order to have a sharp image of a prominence, for instance, then he must repeat the whole examination process from the beginning, in order to find the appropriate lens, such as by turning the lens wheel, and then he must again read the value of the setting after removing the ophthalmoscope from the eye.

The need which thus exists to interrupt the examination between two readings is a serious disadvantage in many examinations. It is frequently difficult to relocate the portion of the patient's retina previously dealt with, the patient becomes irritated, and under these circumstances tends to change his pattern of accommodation, which leads to incorrect data, which in turn causes a number of interruptions in the examination which are inconvenient and time-consuming for the physician.

The underlying purpose of the invention is to create a device for use in the ophthalmoscope and other ophthalmological hand instruments, which will permit the physician, without interrupting his examination or the necessity of changing the position of the instrument, which is essential to the examination, to obtain necessary information as to the momentary value of adjustable or variable properties of the instrument.

This purpose is achieved in accordance with the invention by having numbers, symbols or scales which convey information as to the momentary values of variable factors reflected with the aid of optical elements into the viewing path, in such a manner that they become visible and readable in the viewing aperture of the instrument being used by the examiner by the activation of suitably located controls.

In a form of embodiment of the invention, the numbers, symbols or scales are reflected into the viewing apertures by means of mirrors or by means of a prism. Provision is made for bringing this mirror or prism in front of the viewing aperture, by means of a mechanically activated device, only when the scale adjustments are to be read. During the examination itself, i.e., for so long as the physician is looking through an ophthalmoscope (or other instrument) at the retina of the patient's eye, the reflecting device is kept out of the field of vision.

Insofar as the figures or other markings to be reflected into the viewing aperture are located inside the instrument and may not be illuminated by light from the outside, it is necessary to make these visible by an appropriate illuminating device, at least during the time when they are being read. Provision has therefore been made, in the ophthalmoscopes and other ophthalmological hand instruments, which possess a built-in light source, for this light source to obtain the light necessary for illuminating the figures, etc., in such a way that the light is brought from the light source, by means of a photoconductor, to the spot where the numbers, symbols or scales are located.

In another embodiment of the invention, a partially transparent mirror, preferably an unsilvered, thin plate with parallel faces, made of a transparent material, especially glass, which reflects the numbers into the viewing aperture as needed, when additional optical devices are inserted into the light path. In the case of this form of embodiment, means are provided which may be turned on only when a reading is to be made, while at other times the figures remain unilluminated and are therefore invisible.

A further variation of the last-mentioned form of embodiment provides for the use of an additional light source, such as small incandescent bulb, located at a suitable point, to illuminate the figures to be reflected into the eye piece, this bulb being switched on by means of a suitably located control when a reading is to be made.

In the case of hand ophthalmoscopes, means of providing lenses of a particular refractive power, such as ± 10 diopters, are known to the art, which may be inserted into the line of vision in addition to the lenses located on the lens holder, such as the lens wheel, by means of a suitable control device, such as slide or something similar, in order to expand the range of available refractions. For example, if the lens with +20

D on the lens wheel is inserted, then an additionally inserted lens with an index of +10 D will give a total refractive power of +30 D. But if, an embodiment of the ophthalmoscope corresponding to the invention, only the refractive power of the lens in the lens holder, but not the supplementary lens, is reflected, the one with the value of +20 D, to use our example, then it will be possible for an error to be made by the physician in his reading, should he forget to take into consideration the extra lens.

Thus provision has been made for a further development of the invention, that of connecting the control that switches on the reflecting mechanism and that which switches in the extra lens, in such a way that the reflection mechanism can only be switched on when no extra lenses are in use.

In another form of embodiment, when an extra lens is inserted, a number disc is so placed in relationship to the numbers of the lens carrier that the refraction reading of the extra lens is reflected into the viewing aperture along with the lens inserted into the lens carrier.

In graduated skiascopes, it is possible for numbers, for example, to be reflected, in a usage analogous to that of the invention, these numbers giving the angular positions of the beam of light and/or numbers or symbols that characterize the divergence or convergence of the light beams.

The drawings represent a form of embodiment of the invention, using an ophthalmoscope as an illustrative example.

FIGS. 4a and 4b show a detail of the device used to illuminate the numbers for reading.

FIGS. 5a, 5b and 6 show two further forms of embodiment of the internal reading device.

Figure 2:
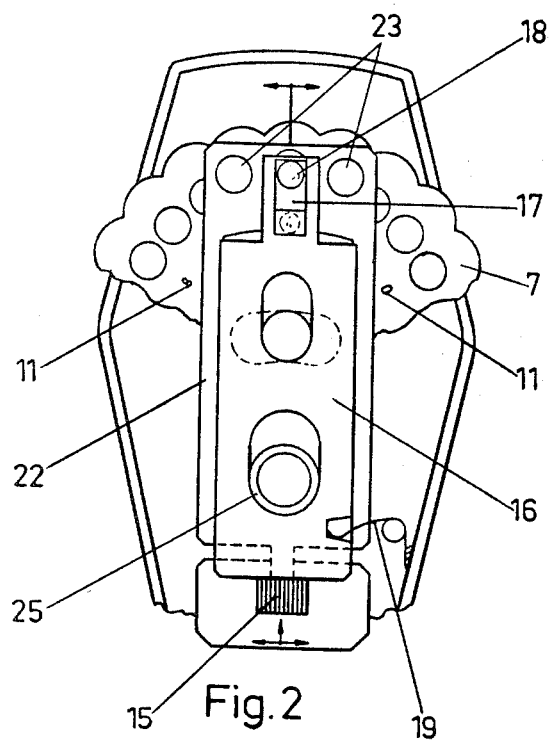
FIG. 2 shows the components essential to internal reading, with the housing cover removed.
Figure 1:
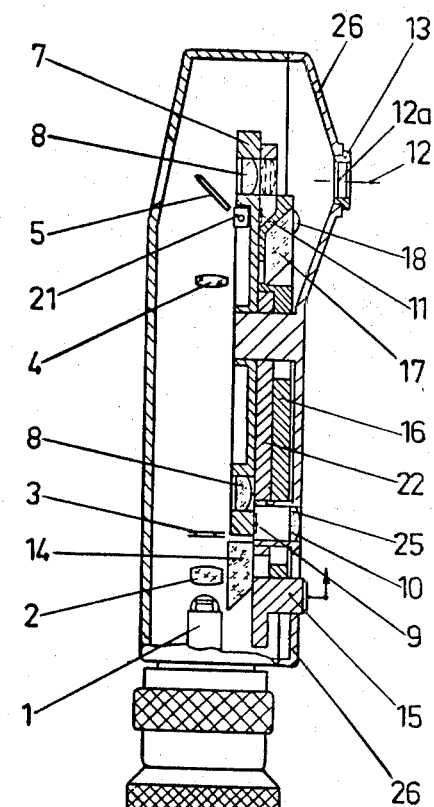
FIG. 1 shows a cross section through an ophthalmoscope corresponding to the invention.
Figure 3:
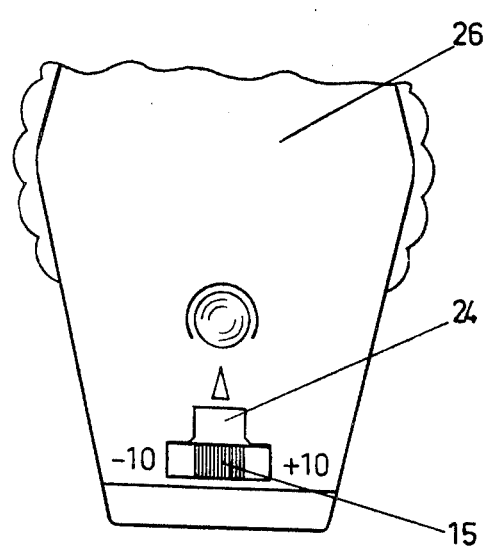
FIG. 3 represents the ophthalmoscope with housing cover in place, seen from the side facing the examiner.

The illuminating device, which consists of the incandescent bulb 1, the condenser 2, a radiant field stop 3, the illumination lens 4, and the deflecting mirror 5, is given only a schematic representation, as is also the handle 6, which can contain the batteries necessary for operating the device.

According to West German Patent No. 1,772,893, the ophthalmoscope may also be constructed in such a way as to be exclusively or selectively equipped for operation with an external light source, via a photoconductive cable. In this case, the photoconductive rod, which replaces the incondescent bulb inside the ophthalmoscope, is designed in such a way that the light used to illuminate the numbers indicating the diopter readings is brought to it in some suitable way.

The lens carrier 7, is here represented as a lens wheel (Rekoss disk). This lens carrier contains a number of lenses 8, of varying refractive power, in a suitable gradation. When using the ophthalmoscope, the examiner looks through the viewing aperture 12, which can be closed by means of a flat pane of glass 12a, through the inserted lens 8, across the edges of the deflecting mirror 5, into the patient's eye. Provision can be made for the frame 13, of the glass pane 12, to be easily replaceable, so that there will be the possibility of exchanging the flat pane with a lens to correct any possible errors in refraction of the examiner's eye.

Numbers 9, are printed onto the lens carrier 7, these being read by means of the reading glass 10, these numbers stating the power of refraction of the lens 8, which is at the moment inserted into the line of sight. These numbers are illuminated by light from the bulb 1, from the side, entering via the prism 14.

By means of the slide 15, which is located in such a position as to be conveniently moved with one finger of the hand holding the instrument, it is possible to move the carrier 16, upward, so that the prism 17, and the reading glass 18, which is cemented to the prism or fastened to it in some other suitable way, is moved in front of the numbers 11, in such a manner that these numbers may be read by means of the reading glass 18, which is located at this position of the carrier, behind the viewing window 12. If the slide 15, is released, then the spring 19, will again bring it dowward into its original position. This leaves the line of sight open through the instrument to the patient's eye, so that it is possible to continue immediately with the examination.

In order to permit recognition of the numbers 11, the illuminating device shown in FIG. 4 is provided. Light created off to one side by the incandescent bulb 1, is conducted by a photoconductor 20, made of plastic or glass fibers, to the illuminating prism 21, where it is deflected in the direction of the numbers 11, located in front of the reading prism 17. The lens carrier 7, is made of a transparent material, so that the light from the prism 21, passes through the lens carrier and the numbers are illuminated by the light passing through it.

Lenses 23, are located on the carrier 22, capable of being inserted, as supplements to the lens 8, into the line of sight. If the slide 15, is moved to the left or to the right inside the T-shaped recess 24, then the carrier 22, rotates around the axis 25, which is connected with the housing cover 26, and one of the two lenses 23, which might have a value of ±10 diopters, for example, is inserted into the line of sight. If the slide 15, is moved to the left or to the right, then it may not be moved upward, due to the T-shaped profile of the recess 24. In this way, the internal reading of the lens is rendered inoperative by the insertion of the supplementary lenses.

FIGS. 5a and 5b, show another form of embodiment of the internal reading concept. In this case, instead of the displaceable reading prism 17, an immovable, partially reflecting flat pane of glass 27, and a likewise immovable, fully reflecting mirror 28, are provided. The mirror 27, may consist of a thin disc of flat glass, minus any reflective coating. The reading glass 29, is located between the two mirrors. In place of the mirror 28, and the reading glass 29, it is also possible to use a prism 30 (see FIG. 6), onto which is cemented a magnifying lens 31. To prevent a distortion of the reflected numbers while they are being observed, provision is made to turn on the scale illuminator only during the reading. The slide 32, has an extension 33, with a drilled hole 34. When the slide is pushed upward for reading, then light enters through the hole 34, and is conducted by the photoconductor 20, to the illuminating prism 21. When the slide is in the rest position, then the illumination of the photoconductor and therefore of the scale is broken off, and the numbers are no longer visible.

FIG. 6 shows another arrangement for the reading of the internal scale. A miniature incandescent bulb 35, shines through the numbers 11, in order to illuminate them. Reflection can be effected either by means of the mirrors 27, and 28, and the magnifying lens 29, or by means of a prism 30, a mirror 27, and a magnifying lens 31. The bulb 35, is turned on during reading. When no reading is being made, and the examination is to be continued, the bulb is turned off. The switch for the incandescent bulb 35, is located at a spot where it can be operated with one finger of the hand holding the instrument, without interrupting the examination. The switch can be connected with the auxiliary lens control, corresponding to the slide 15, in such a way that it is impossible to turn on the bulb when one of the auxiliary lenses 23, is interposed.

What is claimed is:

1. A diagnostic instrument for use in observation and/or analysis of the eye comprising an instrument chassis having a viewing passage through which the examiner observes the eye, means for varying selected parameters of the optical function of said instrument while the instrument is in use with the examiner looking through the viewing passage, indicia carrying means for identifying the value of said variable parameters of said intrument, said indicia not being visible within said viewing passage during normal observation with said instrument, optical means for rendering said indicia visible within said viewing passage when said indicia are illuminated, a light source for providing illumination during normal use of said instrument, a bundle of optical fibers communicating light from said light source to a position adjacent said indicia carrying means for illuminating said indicia under control of said examiner and rendering said indicia visible within said viewing passage so that said examiner can determine said parameters without removing the instrument from viewing position.

2. A diagnostic instrument for use in observation and/or analysis of the eye comprising an instrument chassis having a viewing passage through which the examiner observes the eye, means for varying selected parameters of the optical function of the instrument while the instrument is in use with the examiner looking through the viewing passage, indicia carrying means for identifying the value of said variable parameters of said instrument, said indicia not being visible within said viewing passage during normal observation with said instrument, optical means including a partially reflective mirror positioned within said viewing passage, said indicia being positioned so as to be observable in said mirror when illuminated, and indicia illuminating means under control of said operator for illuminating said indicia at a desired time during use of said instrument, thereby rendering said indicia visible within said viewing passage so that said examiner can determine said parameters without removing said instrument from viewing position.

3. A diagnostic instrument for use in observation and/or analysis of the eye comprising an instrument chassis having a viewing passage through which the examiner observes the eye, means for varying selected parameters of the optical function of the instrument while the instrument is in use with the examiner looking through the viewing passage, indicia carrying means for identifying the value of said variable parameters of said instrument, said indicia not being visible within said viewing passage during normal observation with said instrument, optical means adapted to be interposed in said viewing passage for rendering said indicia visible within said viewing passage for a brief interval and control means accessable to the examiner for presenting said indicia within said viewing passage at a desired time while said instrument is in use so that said examiner can determine said parameters without removing said instrument from viewing position.

4. A diagnostic instrument for use in observation and/or analysis of the eye comprising an instrument chassis having a viewing passage through which the examiner observes the eye, means for varying the power of a lens inserted in the viewing passage while the instrument is in use with the operator looking through the passage, indicia carrying means for identifying the power of the lens in said viewing passage, optical means rendering said indicia visible within said viewing passage, and means for inserting a supplemental lens in said viewing passage, said supplemental lens inserting means disabling said optical means so that said indicia may not be rendered visible when said supplemental lens is inserted.

5. A diagnostic instrument for use in observation and/or analysis of the eye comprising an instrument chassis having a viewing passage through which the examiner observes the eye, means for varying the power of a lens inserted in the viewing passage while the instrument is in use with the operator looking through the passage, indicia carrying means for identifying the power of the lens in said viewing passage, optical means rendering said indicia visible within said viewing passage, and means for inserting a supplemental lens in said viewing passage, said supplemental lens inserting means rendering supplemental indicia visible in said viewing passage indicating that said supplemental lens is inserted.

* * * * *